(12) United States Patent
Stein et al.

(10) Patent No.: US 10,767,798 B2
(45) Date of Patent: Sep. 8, 2020

(54) HOSE CONNECTOR ASSEMBLY, USE OF A HOSE CONNECTOR ASSEMBLY, AND SANITARY FITTING

(71) Applicant: Neoperl GmbH, Mullheim (DE)

(72) Inventors: Alexander Stein, Ihringen (DE); Daniel Oechsle, Mullheim (DE)

(73) Assignee: Neoperl GmbH, Müllheim (DE)

( * ) Notice: Subject to any disclaimer, the term of this patent is extended or adjusted under 35 U.S.C. 154(b) by 351 days.

(21) Appl. No.: 15/846,684

(22) Filed: Dec. 19, 2017

(65) Prior Publication Data

US 2018/0209571 A1  Jul. 26, 2018

(30) Foreign Application Priority Data

Jan. 26, 2017 (DE) .................. 20 2017 100 423 U

(51) Int. Cl.
| | |
|---|---|
| F16L 39/00 | (2006.01) |
| F16L 37/084 | (2006.01) |
| E03C 1/084 | (2006.01) |
| E03C 1/086 | (2006.01) |
| F16L 15/08 | (2006.01) |
| E03C 1/04 | (2006.01) |
| E03C 1/08 | (2006.01) |

(52) U.S. Cl.
CPC ........ *F16L 37/0845* (2013.01); *E03C 1/0404* (2013.01); *E03C 1/084* (2013.01); *E03C 1/086* (2013.01); *F16L 15/08* (2013.01); *E03C 1/08* (2013.01)

(58) Field of Classification Search
CPC F16L 19/04; F16L 39/00; E03C 1/086; E03C 1/084

USPC ................. 285/124.2, 124.3, 124.4
See application file for complete search history.

(56) References Cited

U.S. PATENT DOCUMENTS

| | | | | |
|---|---|---|---|---|
| 3,135,535 A | * | 6/1964 | Shepard | F16L 5/02 285/124.2 |
| 3,590,855 A | * | 7/1971 | Woollen | B67D 1/0867 137/375 |
| 4,378,124 A | * | 3/1983 | Weirich | F16L 39/02 285/124.4 |
| 4,382,618 A | * | 5/1983 | Grisebach | F16L 39/02 285/124.4 |
| 4,382,619 A | * | 5/1983 | Grisebach | F16L 39/02 285/124.4 |
| 4,468,054 A | * | 8/1984 | Orth | F25B 41/062 285/124.3 |
| 4,544,185 A | * | 10/1985 | Weirich | F16L 39/02 285/124.4 |

(Continued)

FOREIGN PATENT DOCUMENTS

| | | |
|---|---|---|
| DE | 102014001818 | 8/2015 |
| EP | 2497866 | 9/2012 |

(Continued)

*Primary Examiner* — David Bochna
(74) *Attorney, Agent, or Firm* — Volpe and Koenig, P.C.

(57) ABSTRACT

In the case of a hose connector assembly (1) it is provided for a retaining plate (15) to be used for axially fixing at least two hoses (6, 7, 8) in corresponding hose receptacles (3, 4, 5). The hoses (6, 7, 8) are insertable into respective recesses (16, 17, 18) of the retaining plate (15) by way of a lateral insertion movement (19), and the hoses (6, 7, 8) engage behind the recesses (16, 17, 18).

18 Claims, 6 Drawing Sheets

(56) References Cited

U.S. PATENT DOCUMENTS

| | | | | |
|---|---|---|---|---|
| 4,667,987 A | * | 5/1987 | Knebel | E03C 1/0403 |
| | | | | 285/124.4 |
| 5,860,681 A | * | 1/1999 | Slais | B60H 1/00571 |
| | | | | 285/124.3 |
| 6,450,552 B1 | * | 9/2002 | Pulmanns | E03C 1/0403 |
| | | | | 285/124.3 |
| 6,669,238 B1 | * | 12/2003 | Santy, Jr. | F16L 39/00 |
| | | | | 285/124.3 |
| 6,997,420 B2 | * | 2/2006 | Yudis | F16L 35/00 |
| | | | | 285/124.4 |
| 8,424,920 B2 | * | 4/2013 | Gilbreath | F16L 37/088 |
| | | | | 285/124.3 |
| 2005/0133100 A1 | | 6/2005 | Bolderheij et al. | |
| 2007/0235091 A1 | | 10/2007 | Granot | |

FOREIGN PATENT DOCUMENTS

| | | |
|---|---|---|
| EP | 3109521 | 12/2016 |
| JP | 2013072237 | 4/2013 |

* cited by examiner

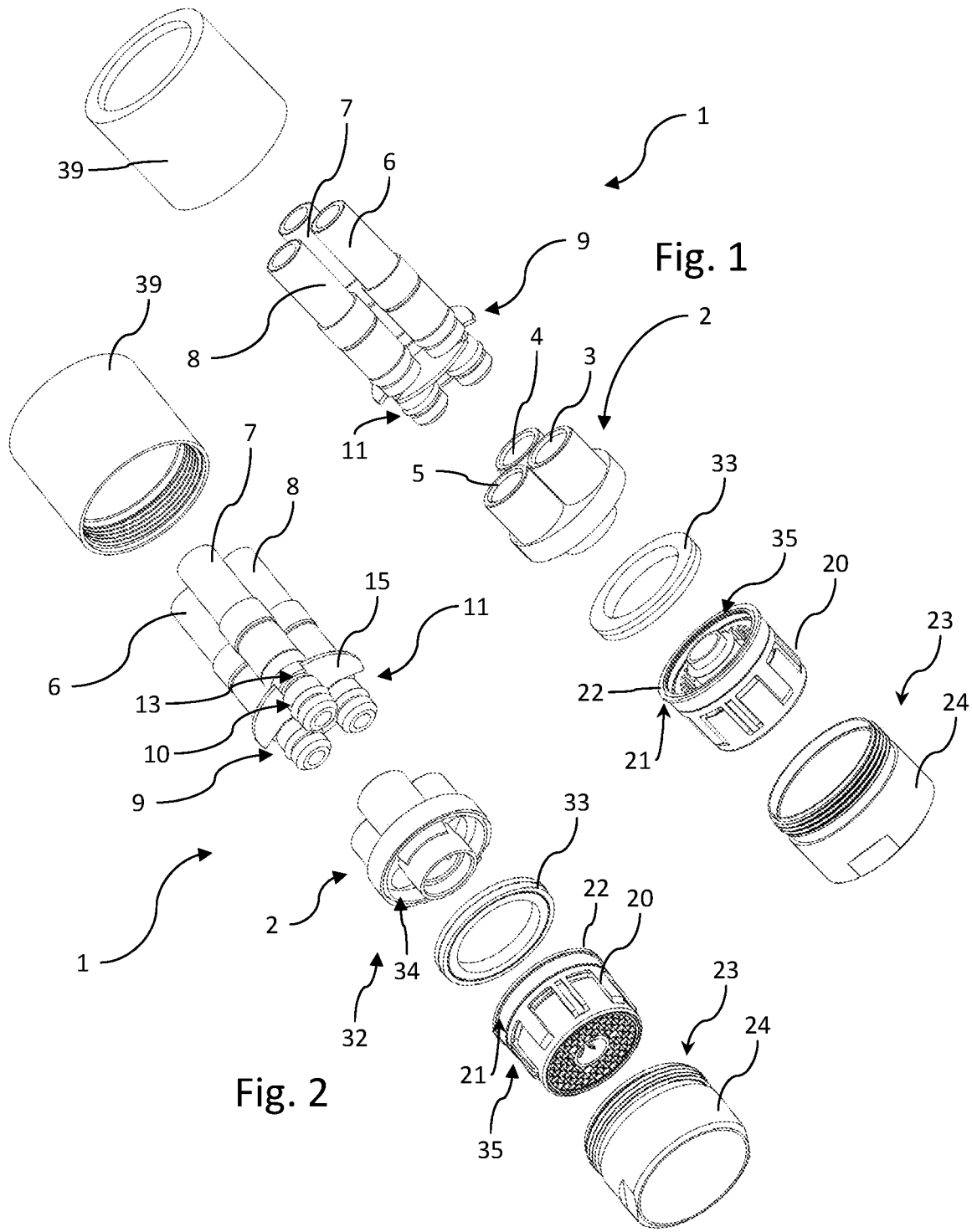

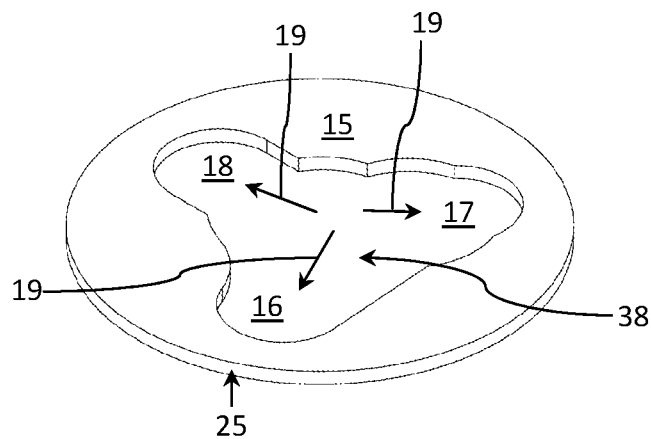
Fig. 10
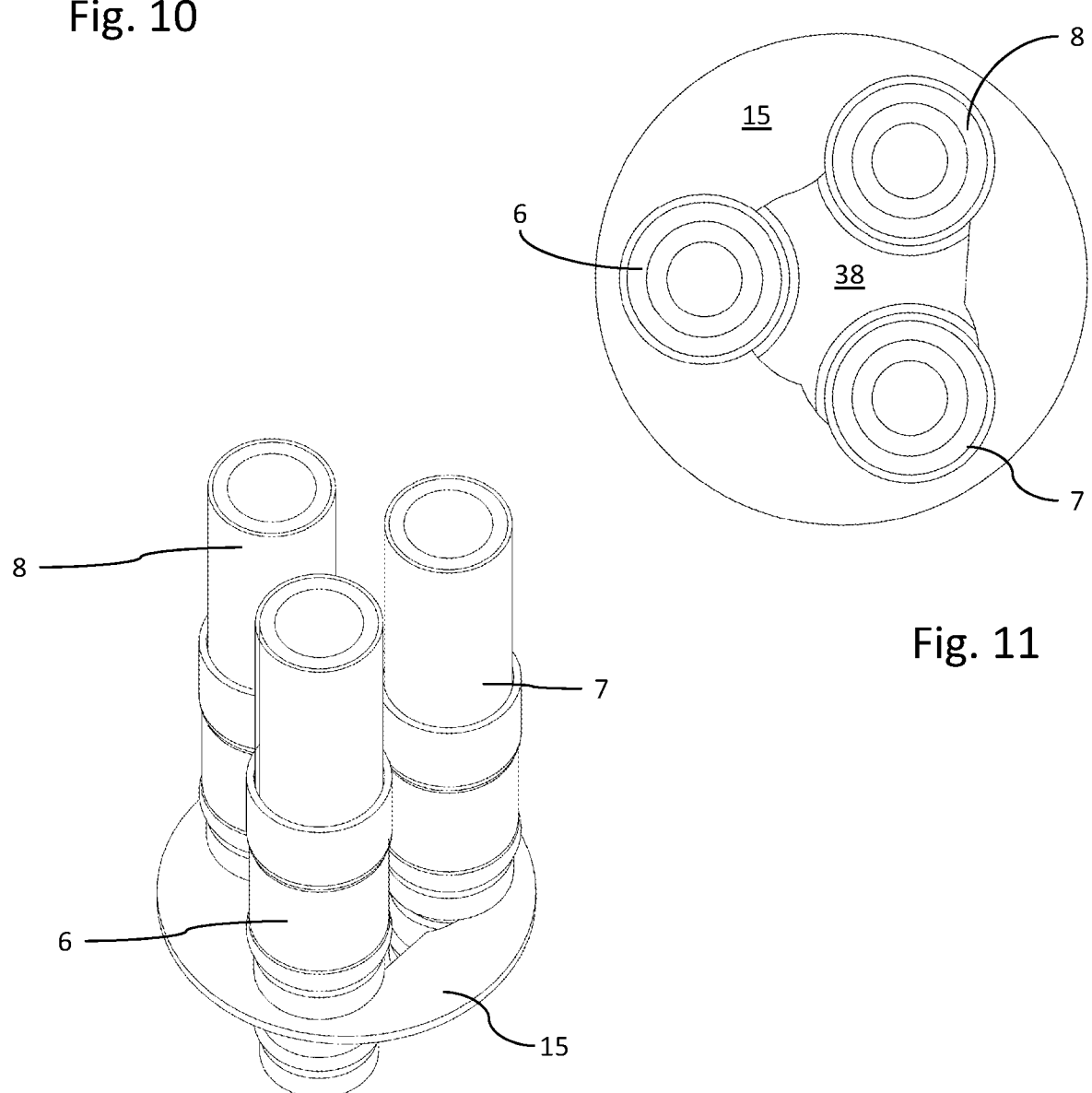
Fig. 11
Fig. 12

HOSE CONNECTOR ASSEMBLY, USE OF A HOSE CONNECTOR ASSEMBLY, AND SANITARY FITTING

INCORPORATION BY REFERENCE

The following documents are incorporated herein by reference as if fully set forth: German Patent Application No. 20 2017 100 423.6, filed Jan. 26, 2017.

BACKGROUND

The invention relates to a hose connector assembly having a main body on which at least two hose receptacles are configured, having at least two hoses which by way of the respective ends thereof are plug-fitted in each case into one of the at least two hose receptacles. One retaining edge is configured on each of the at least two hoses, having a retaining plate in which in a manner corresponding to the at least two hose receptacles at least two receptacles are configured into which in each case one of the at least two hoses by way of an insertion movement that is aligned so as to be transverse to a longitudinal direction of the respective hose is insertable, such that the associated retaining edge engages across the retaining plate in order to prevent the hoses being pulled out of the hose receptacles.

The invention furthermore relates to a use of a hose connector assembly in a sanitary fitting.

The invention finally relates to a sanitary fitting.

In the case of sanitary fittings it is known for various components, in particular built-in components, to be provided with connector hoses. Components of this type can be mixing valves or mixing cartridges, for example, other valves or else sanitary outlet parts. In the case of hose connectors of this type there is in general the requirement for a permanent and tight connection to be established. This also entails a sufficient stability in relation to mechanical stresses, in particular tensile stresses on the respective hoses.

To this end, it has become usual practice for the hoses to be provided with a thread which is screw-fitted into a respective hose receptacle. However this has proven to be complex in terms of production.

SUMMARY

The invention is based on the object of simplifying the assembly of a hose connector assembly of this type.

This objective is achieved using one or more features according to the invention. In order for the object mentioned to be achieved in the case of a hose connector assembly of the type described at the outset it is provided according to the invention that a detent on which the main body is capable of being pressed against the externally supported retaining plate is configured on a mouth part that is attached to the main body on the downstream side. An inserted hose, the retaining edge of which is configured between the retaining plate and the main body, by way of simple measures can thus be reliably retained on a receiving sanitary fitting between the retaining plate and the main body. The invention thus enables the retaining plate to be retained in a receiving sanitary fitting in a fixed relative position to the main body, on account of which a reliable connection of the hose which also withstands mechanical tensile stresses is achievable.

The invention has the further advantage that the hoses are plug-fittable into the hose receptacles in various orientations. This can reduce or eliminate any torsional stress on the hoses.

The retaining plate is preferably configured so as to be disk-shaped.

In the case of one advantageous design embodiment it is provided that the detent is configured as an encircling shoulder. It is advantageous herein that fixing to the retaining plate is enabled so as to be independent of an orientation in which the respective hose is plug-fitted into the associated hose receptacle.

Alternatively or additionally, a second embodiment of a hose connector assembly is provided with one or more features of the invention in order for the object mentioned to be achieved. In the case of a hose connector assembly of the type mentioned at the outset it is thus alternatively or additionally provided according to the invention in order for the object mentioned to be achieved that a third hose receptacle is configured in the main body, that a third hose by way of the end thereof is plug-fitted into the third hose receptacle, that a retaining edge is configured on the third hose, that in a manner corresponding to the third hose receptacle a receptacle is configured into which the third hose by way of an insertion movement that is aligned so as to be transverse to a longitudinal direction of the third hose is insertable in the retaining plate, such that the associated retaining edge engages across the retaining plate in order to prevent the hose being pulled out of the hose receptacle. The invention thus enables the common axial fixing of three hoses by way of a common retaining plate. This facilitates the assembly.

The three hoses herein can be utilizable, for example, for the infeed of cold water and warm water and for the discharge of mixed water, as is the case with mixing valves or mixing cartridges. Alternatively or additionally, the three hoses can also be usable for the infeed of different liquids to a common sanitary outlet piece.

Alternatively or additionally, the one or more features of a third embodiment of a hose connector assembly are provided in order for the object mentioned to be achieved according to the invention. According to the invention, in the case of a hose connector assembly of the type described at the outset it is thus provided in particular in order for the object mentioned to be achieved that the main body by way of a screw sleeve is capable of being pressed against the externally supported retaining plate. This is particularly favorable when the main body is associated with a sanitary outlet part which, for example, is insertable into a fitting outlet. The possibility of achieving the fixing of the retaining plate to the main body by way of a screw sleeve that is required anyway, for example the outlet mouthpiece, simplifies the assembly complexity.

It can be provided herein in particular that the main body by way of the screw sleeve is capable of being pressed by way of a detent, for example the detent already mentioned, on a mouth part, for example the mouth part already mentioned, that is attached to the main body on the downstream side. This enables a combination of the advantages of the first solution according to the invention as have been described above. The embodiment in at least two parts, having a main body and a mouth part, has the advantage that more complex internal geometries are thus configurable on the main body and the mouth part, said internal geometries being accessible at an opened connection point, for example, where the main body and the mouth part are joined when in use.

In the case of one advantageous design embodiment it can be provided that the screw sleeve is configured as an outlet mouthpiece. A standard part of a sanitary fitting is thus utilizable for fastening the hoses.

In the case of one advantageous design embodiment it can be provided that an outlet mouthpiece, in particular the outlet mouthpiece that has already been mentioned, is pushed fitted onto the mouth part that bears on the detent. A simple means of how a compressive force of the main body can be generated on the retaining plate is thus described. By way of the outlet mouthpiece a standard part of a sanitary fitting is utilizable herein.

In the case of one advantageous design embodiment it can be provided that the at least two recesses by way of the openings thereof point away from one another. The hoses are thus insertable from different directions. This is particularly favorable in order for the hoses to be inserted in a sequential manner. In the case of three recesses it can thus be provided that the recesses point away from one another in pairs. It can be provided herein that the openings in a mutually spaced-apart manner open outwardly on a circumferential contour of the retaining plate. On account thereof, a retaining plate that is producible in a particularly simple manner, for example by punching, can be used.

In the case of one advantageous design embodiment it can be provided that the at least two recesses open into a common central plug-fitting opening of the retaining plate. It is particularly favorable for the retaining plate to border the plug-fitting opening in an annular encircling manner. A retaining plate that is closed toward the outside can thus be formed. The retaining plate is thus producible so as to have an increased stability in relation to mechanical stresses. Even three or more recesses which in each case can receive one hose are configurable.

In the case of one advantageous design embodiment it can be provided that an annular seal which seals the respective hose in the respective hose receptacle is disposed on each of the at least two hoses. Additional securing elements can thus be dispensed with. For example, the annular seals can be preassembled on the respective hose. This arrangement can also be applied to three hoses wherein, for example, each pair of hoses of the three hoses can be designed as described.

It can also be provided that an annular seal which seals the respective hose in the respective hose receptacle is disposed in each of the at least two or three hose receptacles. Additional securing means can thus be dispensed with. For example, the annular seals can be preassembled in the respective hose receptacle.

In the case of one advantageous design embodiment it can be provided that the retaining edges are in each case configured as part of an encircling retaining groove. Axial securing of the hoses in both senses of direction, that is to say against an unintentional extraction from the respective hose receptacle and against an inadvertent impingement by pressure into the hose receptacle is thus achievable. The hoses, prior to being plug-fitted into the respective hose receptacles, are moreover fixable in an axial manner on the retaining plate by being placed into the respective recesses.

In the case of one advantageous design embodiment it can be provided that an annular seal is disposed between the mouth part and the main body. An internal geometry that is enclosed by the mouth part and the main body can thus be sealed in relation to the outside.

In the case of one advantageous design embodiment it can be provided that the main body connects in a liquid-conducting manner at least one substantially punctiform hose receptacle to an annular or C-shaped dispensing opening on that side of said main body that faces away from the at least two, preferably three, hose receptacles. Water streams which are disposed beside one another and are defined by the individual hoses are thus convertible in a simple manner to form a concentric arrangement of water streams. A pleasing or appealing jet pattern in which water jets can exit in a hidden manner in a center can thus be generated.

In the case of one advantageous design embodiment it can be provided that the main body connects in a liquid-conducting manner at least one of the at least two hose receptacles to a dispensing opening on that side of said main body that faces away from the at least two hose receptacles. Three hose receptacles for three hoses are preferably configured.

In the case of one advantageous design embodiment it can be provided that the mouth part is configured as a jet former and/or jet regulator unit. It is particularly favorable herein for at least one, preferably two, of the at least two or three hose receptacles in the main body to be routed to a bypass. An outlet for a liquid which is provided at comparatively low flow rates, for example, such that a flow rate limitation and/or a jet formation or jet aeration is ineffective and/or undesirable is thus able to be formed.

Furthermore the use of such an arrangement according to the invention is also provided in order for the object mentioned to be achieved. In particular, a use of a hose connector assembly according to the invention, in particular of a hose connector assembly according to the description above and/or according to one of the claims that is directed toward a hose connector assembly is thus provided in order for the object mentioned to be achieved in the case of a sanitary fitting in which the at least two hoses are inserted laterally into the retaining plate, the at least two hoses are subsequently introduced into the respective hose receptacle, the main body is inserted into a fitting outlet of the sanitary fitting, and the retaining plate by way of an outlet mouthpiece that engages on the detent is pressed against a support that is configured in the fitting outlet. A simple assembly which can be carried out even in a practically tool-free manner thus results.

It is particularly favorable herein for there to be three hoses to which three hose receptacles on the main body and three recesses on the retaining plate correspond.

In the case of one advantageous design embodiment it can be provided that the support is molded to the outlet mouthpiece in an integral manner. A diversity of parts can thus be minimized.

It can also be provided that the support is formed by an insert part. The support is thus able to be subsequently formed in a simple manner or can be omitted in the case of further variants without a receiving structure, for example a fitting outlet, having to be adapted. The insert part can be a snap ring, for example. The latter can be fitted in a simple manner.

In the case of one advantageous design embodiment it can be provided that the outlet mouthpiece presses the mouth part against the main body. It is advantageous herein for the outlet mouthpiece to be able to retain the main body so as to be fixed in the position thereof and at the same time to maintain the main body and the retaining plate so as to be fixed in relation to one another. A number of manufacturing and assembly steps can thus be reduced.

Alternatively or additionally, it can be provided that the outlet mouthpiece is screw-fitted to the fitting outlet. A screw connection represents a simple and stress-resistant connection means.

In the case of one advantageous design embodiment it can be provided that the retaining plate has three recesses into which in each case one hose by way of an insertion movement that is aligned so as to be transverse to a longitudinal direction of the respective hose is inserted, and wherein the hoses are subsequently inserted into a main body on which three corresponding hose receptacles are configured. Diverse applications are thus implementable, for example the infeed of hot, cold, and mixed water, or of pure water and water that is provided with additives.

Finally, a sanitary fitting with one or more of the features of the invention is provided in order for the object mentioned to be achieved. According to the invention, it is thus provided in the case of a sanitary fitting in particular that the sanitary fitting is formed by a use according to the invention, in particular as has been described above and/or according to one of the claims that is directed toward a use. A sanitary fitting that is simple to assemble can thus be provided.

Alternatively or additionally, it can thus be provided that the sanitary fitting on a fitting outlet has a hose connector assembly according to the invention, in particular as has been described above and/or according to one of the claims that is directed toward a hose connector assembly. The hose connector assembly according to the invention thus finds a preferred application.

BRIEF DESCRIPTION OF THE DRAWINGS

The invention will now be described in more detail through the use of exemplary embodiments but is not limited to these exemplary embodiments. Further exemplary embodiments are derived by the combination of the features of individual or several claims with one another and/or by the combination with individual or several features of the exemplary embodiments.

In the figures:

FIG. 1 shows a hose connector assembly according to the invention in an exploded illustration, in the viewing direction toward the inlet side;

FIG. 2 shows the hose connector assembly according to FIG. 1 in an exploded illustration, in the viewing direction toward the outlet side;

FIG. 10 shows a plan view of a further retaining plate in an annular shape for a hose connector assembly according to FIG. 1;

FIG. 11 shows the retaining plate from FIG. 10, having inserted hoses;

FIG. 12 shows a three-dimensional oblique view toward the main plate, having hoses according to FIG. 11;

DETAILED DESCRIPTION OF THE PREFERRED EMBODIMENTS

Figure 4:
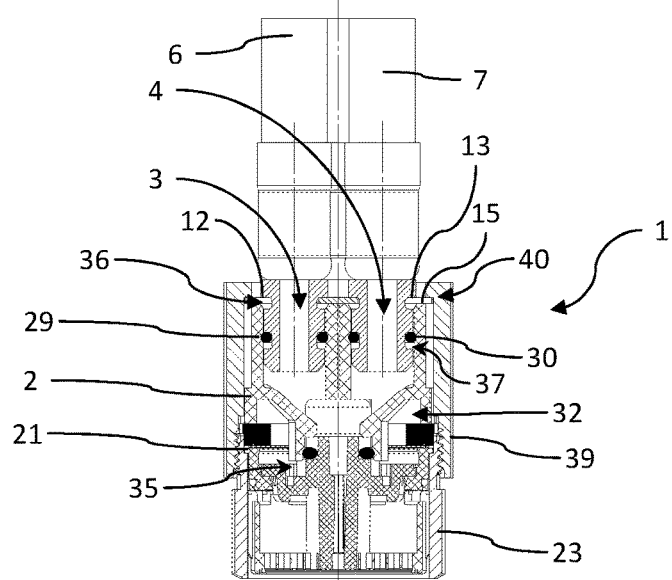
FIG. 4 shows a longitudinal section along the section plane in FIG. 3.
Figure 3:
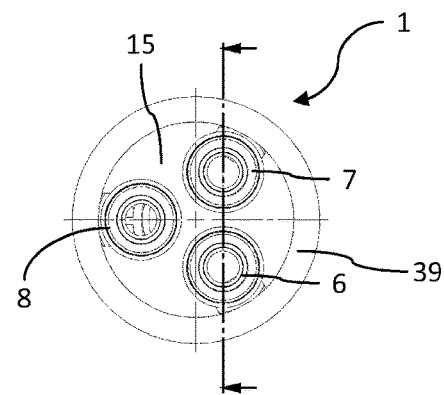
FIG. 3 shows a view toward the inlet side of the hose connector assembly according to FIG. 1.
Figure 6:
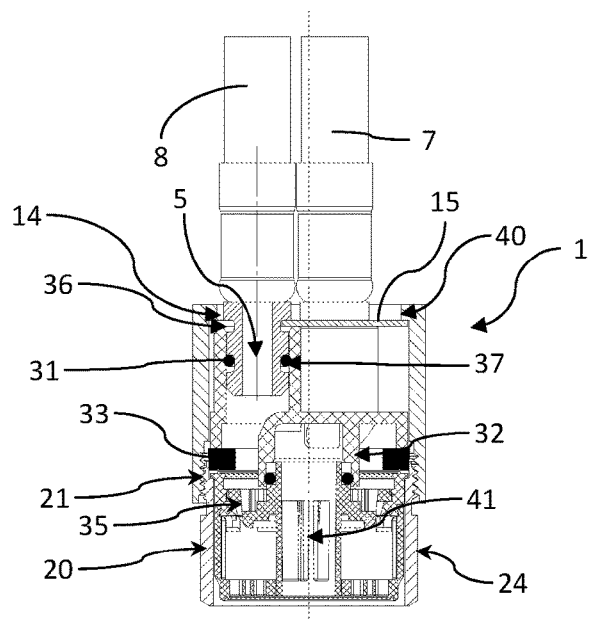
FIG. 6 shows a longitudinal section along the section plane from FIG. 5.
Figure 5:
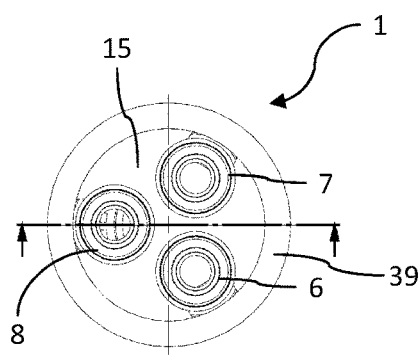
FIG. 5 shows a view according to FIG. 3, using a further section plane.

FIGS. 1 to 9 show different views of a hose connector assembly 1 according to the invention, and will be described collectively hereunder.

The housing connector assembly 1 has a main body 2 on which three hose receptacles 3, 4, 5 are configured.

One hose 6, 7, 8 having a respective end 9, 10, 11 is plug-fitted into each hose receptacle 3, 4, 5.

Two or more than three hose receptacles and hoses are present in the case of further exemplary embodiments.

A retaining edge 12, 13, 14 in the form of an encircling shoulder is configured on each of the hoses 6, 7, 8 in FIGS. 1 to 9 in the region of the respective end 9, 10, 11, the respective hose 6, 7, 8, being retained by said retaining edge 12, 13, 14 on a retaining plate 15.

To this end, three recesses 16, 17, 18 which in terms of position and size correspond to the hose receptacles 12, 13, 14 and to an external diameter of the ends 9, 10, 11 and of the retaining edges 12, 13, 14 are configured on the retaining plate 15, such that the retaining edges 12, 13, 14 engage across the retaining plate 15.

These recesses 16, 17, 18 are in a plane that is defined by the retaining plate 15 and are oriented outwardly such that the ends 9, 10, 11 by way of an insertion movement 19 that in each case is aligned so as to be transverse to a longitudinal direction of the hoses 6, 7, 8, or is laterally aligned, and runs in the plane can be inserted into the associated recess 16, 17, 18 and when in use are inserted therein. The fixing function of the retaining edge 12, 13, 14 in the axial or longitudinal direction results on account thereof.

The ends 9, 10, 11 are subsequently plug-fitted into the associated hose receptacles 3, 4, 5, and the retaining plate 15 prevents the hoses 6, 7, 8 being pulled out of the respective hose receptacle 3, 4, 5.

A mouth part 20 is attached to the main body 2 on the downstream side, that is to say on a side that is opposite to the hose receptacles 3, 4, 5.

A detent 21, for example as an encircling shoulder 22, is configured on this mouth part 20.

This detent 21 is positioned on the mouth part 20 such that the main body 2 is pressed on the retaining plate 15 when the mouth part 20 is placed onto the main body 2, the retaining plate 15 is externally supported, for example by a counter support, and a force that is directed in the longitudinal direction or toward the retaining plate 15 is exerted on the detent 21.

The hose connector assembly 1 furthermore has a screw sleeve 23 which in the use position impinges the detent 21 and generates the force mentioned.

In the case of further exemplary embodiments, the detent 21 is configured directly on an integral main body 2, wherein the screw sleeve 23 engages directly on the main body 2.

In the case of further exemplary embodiments, the main body 2 or the mouth part 20 is fastened and pressed against the retaining plate 15 with the aid of a non-screwed connection, for example a snap connection, a bayonet connection, or a latching connection.

In the exemplary embodiment according to FIGS. 1 to 9, the screw sleeve 23 is configured as an outlet mouthpiece 24 having a standard dimension used in the sanitary industry.

This outlet mouthpiece 24 is placed on the mouth part 20 in such a manner that said outlet mouthpiece 24 receives the mouth part 20 and bears on the detent 21.

Figure 7:
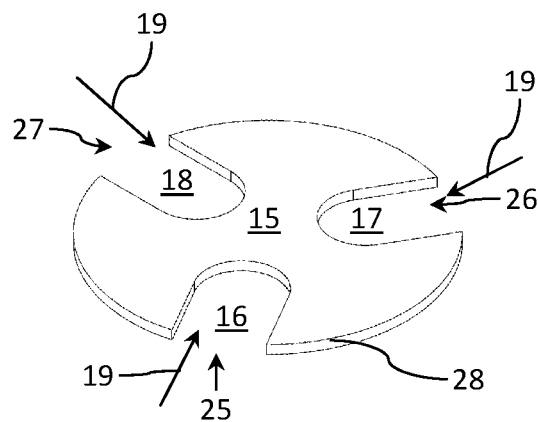
FIG. 7 shows a plan view of the retaining plate of the hose connector assembly according to FIG. 1.
Figure 8:
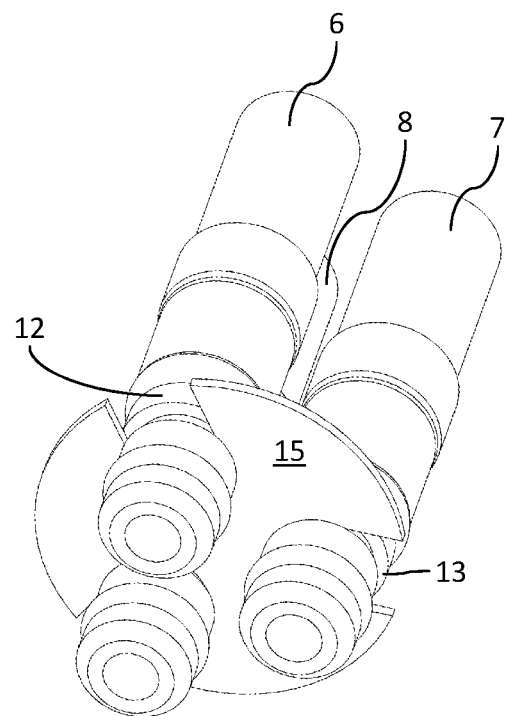
FIG. 8 shows a three-dimensional oblique view toward the retaining plate from FIG. 1, having inserted hoses.
Figure 9:
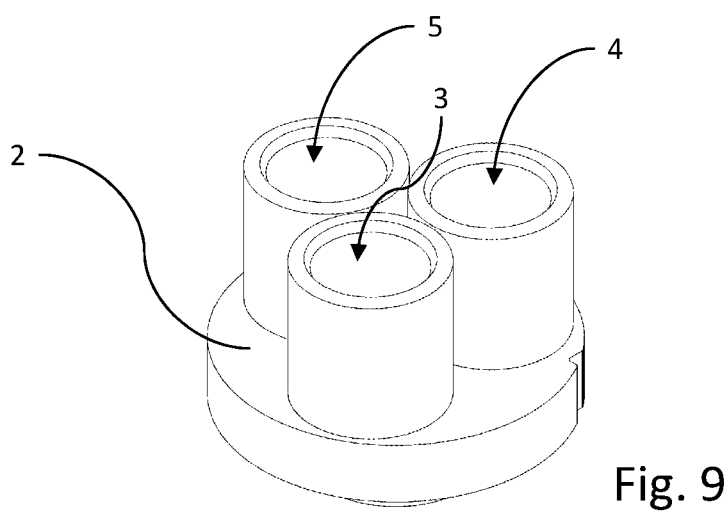
FIG. 9 shows a three-dimensional oblique view toward the main body of the hose connector assembly according to FIG. 1.

It can be seen in FIG. 7 that the recesses 16, 17, 18 by way of their openings 25, 26, 27 point away from one another in a radially outward manner. The plug-fitting movement 19 is thus directed from the outside to the inside.

Moreover, the retaining plate 15 forms a circumferential contour 28 on which the openings 25, 26, 27 in a uniformly distributed and mutually spaced-apart manner open outwardly.

An annular seal 29, 30, 31 is disposed on each hose 6, 7, 8 in the region of the respective end 9, 10, 11. The annular seals 29, 30, 31 in the use position lie between the respective hose 6, 7, 8 and the main body 2 in the respective hose receptacle 3, 4, 5. These annular seals 29, 30, 31 seal the connection of the respective hose 6, 7, 8 on the main body 2.

The mouth part 20 and the main body 2 enclose a complex internal geometry 32 which is closed toward the outside by an annular seal 33.

The hose receptacles 3, 4, 5 are substantially punctiform, as can be seen from FIGS. 1 to 9. The main body 2 has a system of internal connection lines which are not illustrated in more detail here. These connection lines route the hose receptacle 5 toward a dispensing opening 34 which in relation to said connection lines is annular. The dispensing opening 34 is thus connected in a fluid-conducting manner to the hose receptacle 5.

A jet former and/or jet regulator unit 35 which is supplied with liquid by the dispensing opening 34 is configured in the mouth part 20.

By contrast, the hose receptacles 3 and 4 as a bypass 41 are routed past the jet former and/or jet regulator unit 35 such that they in an unimpeded manner open toward the outside, creating a central unified jet.

The retaining edges 12, 13, 14 are in each case configured as lateral delimitations of a retaining groove 36 in order for the ends 9, 10, 11 to be fixed in both axial directions.

It can also be seen in FIGS. 1 to 9 that the annular seals 29, 30, 31 are in each case disposed in a receptacle groove 37.

FIGS. 10 to 12 show a further retaining plate 15 which in the case of the hose connector assembly 1 described is employable instead of the retaining plate 15 as has been illustrated in FIGS. 1 to 9. Components or functional units which in terms of function or construction are equivalent or identical to the preceding exemplary embodiments are identified with the same reference signs and are not described separately once again. Therefore, the explanations pertaining to FIGS. 1 to 9 apply to FIGS. 10 to 12 in analogous manner.

The exemplary embodiment according to FIGS. 10 to 12 differs from the preceding exemplary embodiments at least in that the recesses 16, 17, 18 open inwardly into a common central plug-fitting opening 38 of the retaining plate 15.

The retaining plate 15 thus borders the plug-fitting opening 38 in an annular encircling manner.

In the case of this exemplary embodiment, the hoses 6, 7, 8 in an insertion movement 19 that is guided laterally and from the inside to the outside are insertable into the recesses 16, 17, 18.

In the case of further exemplary embodiments the retaining plate has a system of recesses that are open toward the outside and recesses that are open toward the inside.

Figure 14:
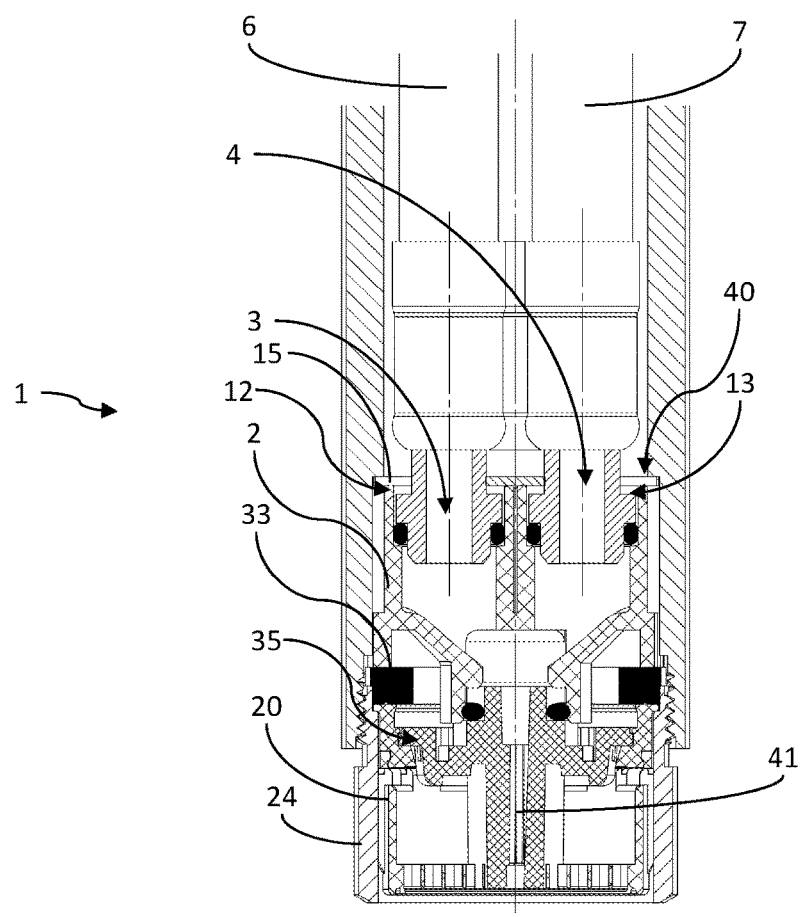
FIG. 14 shows a longitudinal section along the section plane from FIG. 13.
Figure 15:
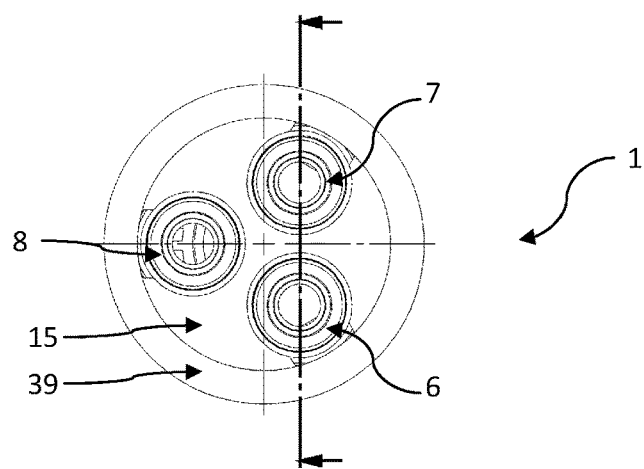
FIG. 15 shows a view toward the inlet side of a further hose connector assembly.
Figure 16:
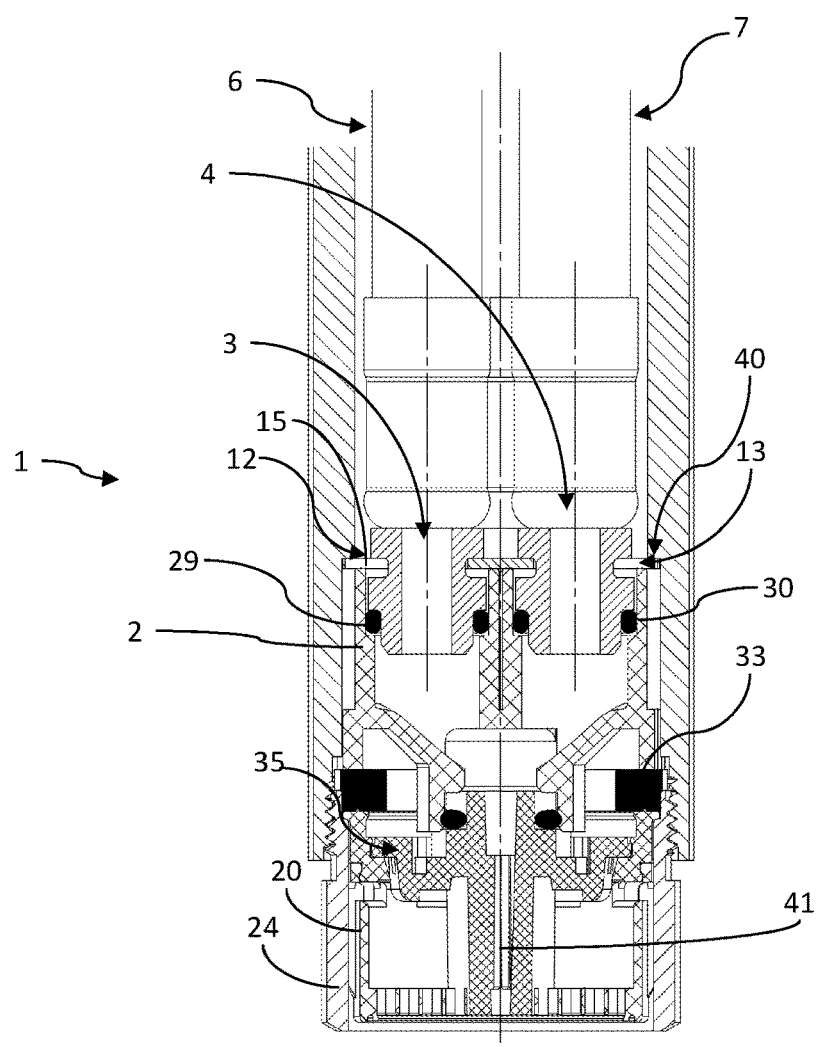
FIG. 16 shows a longitudinal section along the section plane from FIG. 15.

FIGS. 15 and 16 show a further hose connector assembly 1 according to the invention. Components or functional units which in terms of function or construction are equivalent or identical to the preceding exemplary embodiments are identified with the same reference signs and are not described separately once again. Therefore, the explanations pertaining to FIGS. 1 to 12 apply to FIGS. 13 and 14 in analogous manner.

Figure 13:
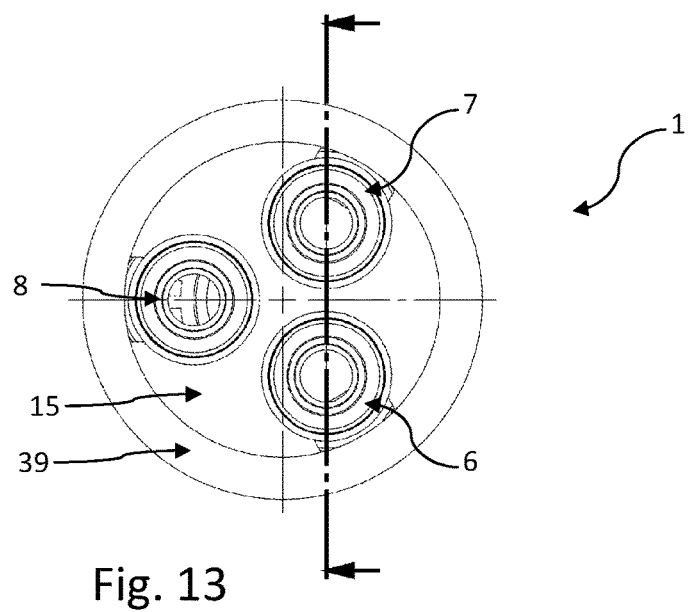
FIG. 13 shows a view toward the inlet side of a further hose connector assembly.

The exemplary embodiment according to FIGS. 13 and 14 differs from the preceding exemplary embodiments at least in that the retaining plate 15 is retained only unilaterally by the hoses 6, 7, 8. The retaining edge 14 is thus not joined to form a retaining groove.

The retaining edge 14 in the use position is disposed between the retaining plate 15 and the main body 2 and engages across the retaining plate 15 in order to prevent the respective hose 6, 7, 8 being pulled out.

FIGS. 15 and 16 show a further hose connector assembly 1 according to the invention. Components or functional units which in terms of function or construction are equivalent or identical to the preceding exemplary embodiments are identified with the same reference signs and are not described separately once again. Therefore, the explanations pertaining to FIGS. 1 to 14 apply to FIGS. 15 and 16 in analogous manner.

The exemplary embodiment according to FIGS. 15 and 16 differs from the preceding exemplary embodiments at least in that the annular seals 29, 30, 31 are retained not in a receptacle groove but are retained unilaterally on the respective hose receptacle 3, 4, 5 and on the respective end 9, 10, 11. The annular seals 29, 30, 31, prior to the respective hose being plug-fitted, for assembly can thus either be plug-fitted to the end 9, 10, 11 or be placed into the hose receptacle 3, 4, 5.

In order to be used, the hose connector assembly 1 in the case of the use on a fitting outlet 39 of a sanitary fitting is joined as follows.

First, the hoses 6, 7, 8 are inserted laterally into the retaining plate 15.

The hoses 6, 7, 8 are now subsequently introduced into the respective hose receptacle 9, 10, 11.

Now, the main body 2, with the hoses 6, 7, 8 leading, is inserted into the fitting outlet 39 of the sanitary fitting (not illustrated in more detail).

The retaining plate 15 is now fastened by way of an outlet mouthpiece 24, wherein the latter engages on the detent 21. The retaining plate 15 herein is pressed against a support 40 that is configured in the fitting outlet 39.

The hose connector assembly 1 according to the invention can also be used in the case of further exemplary embodiments for connecting hoses to a mixing valve or a mixing cartridge or any other valve or any other sanitary cartridge.

In the case of a hose connector assembly 1 it is provided that a retaining plate 15 is used for axially fixing at least two hoses 6, 7, 8 in corresponding hose receptacles 3, 4, 5, wherein the hoses 6, 7, 8 by way of a lateral insertion movement 19 are insertable into respective recesses 16, 17, 18 of the retaining plate 15, where said hoses 6, 7, 8 engage behind the recesses 16, 17, 18.

LIST OF REFERENCE SIGNS

1 Hose connector assembly
2 Main body
3 Hose receptacle
4 Hose receptacle
5 Hose receptacle
6 Hose
7 Hose 8 Hose
9 End
10 End
11 End
12 Retaining edge
13 Retaining edge
14 Retaining edge
15 Retaining plate
16 Recess
17 Recess
18 Recess
19 Insertion movement
20 Mouth part
21 Detent
22 Shoulder
23 Screw sleeve
24 Outlet mouthpiece
25 Opening
26 Opening
27 Opening
28 Circumferential contour
29 Annular seal
30 Annular seal
31 Annular seal
32 Internal geometry
33 Annular seal
34 Dispensing opening
35 Jet former and/or jet regulator unit
36 Retaining groove
37 Receptacle groove
38 Plug-fitting opening
39 Fitting outlet
40 Support
41 Bypass

The invention claimed is:

1. A hose connector assembly (1) comprising: a main body (2) including at least two hose receptacles (3, 4, 5), at least two hoses (6, 7, 8) which by way of respective ends (9, 10, 11) thereof are plug-fitted in each case into a respective one of the at least two hose receptacles (3, 4, 5), each of the at least two hoses (6, 7, 8) respectively including at least one retaining edge (12, 13, 14), a retaining plate (15) having at least two receptacles (16, 17, 18) corresponding to the at least two hose receptacles (3, 4, 5), the at least two receptacles (16, 17, 18) each being configured such that a respective one of the at least two hoses (6, 7, 8) is insertable therein by an insertion movement (19) that is aligned transverse to a longitudinal direction of the respective hose (6, 7, 8), such that the associated retaining edge (12, 13, 14) engages across the retaining plate (15) in order to prevent each of the hoses (6, 7, 8) from being pulled out of the respective one of the hose receptacles (3, 4, 5), a mouth part (20) that is attached to the main body (2) on a downstream side, the mouth part including a detent (21) that that is adapted to press the main body (2) against the retaining plate (15), and an outlet mouthpiece (24) is placed on the mouth part (20) that bears on the detent (21).

2. The hose connector assembly (1) as claimed in claim 1, wherein the detent (21) is configured as an encircling shoulder (22).

3. The hose connector assembly (1) as claimed in claim 1, wherein the at least two hose receptacles comprise first, second and third hose receptacles (3, 4, 5) configured in the main body (2), the at least two hoses comprise first, second, and third hoses (6, 7, 8), the respective ends (9, 10, 11) thereof being plug-fitted into the first, second, and third hose receptacles (3, 4, 5), the at least two receptacles (16, 17, 18) of the retaining plate (15) comprise first, second and third receptacles that correspond to the first, second, and third hose receptacles (3, 4, 5), the first, second, and third receptacles (16, 17, 18) each being configured such that a respective one of the first, second, and third hoses (6, 7, 8) is insertable therein by an insertion movement (19) that is aligned transverse to a longitudinal direction of the respective one of the first, second, and third hoses (6, 7, 8), such that the associated retaining edge (12, 13, 14) engages across the retaining plate (15) in order to prevent each of the first, second, and third hoses (6, 7, 8) from being pulled out of the respective one of the hose receptacles (3, 4, 5).

4. The hose connector assembly (1) as claimed in claim 1, further comprising a screw sleeve (23) that is adapted to press the main body (2) against the retaining plate (15).

5. The hose connector assembly (1) as claimed in claim 4, wherein the screw sleeve (23) is part of the outlet mouthpiece (24).

6. The hose connector assembly (1) as claimed in claim 1, wherein the at least two recesses (16, 17, 18) include respective openings (25, 26, 27) that point away from one another.

7. The hose connector assembly (1) as claimed in claim 6, wherein the openings (25, 26, 27) are mutually spaced-apart and open outwardly on a circumferential contour (28) of the retaining plate (15).

8. The hose connector assembly (1) as claimed in claim 1, wherein the at least two recesses (16, 17, 18) open into a common central plug-fitting opening (38) of the retaining plate (15).

9. The hose connector assembly (1) as claimed in claim 1, wherein the retaining edges (12, 13, 14) are in each case configured as part of an encircling retaining groove (36).

10. The hose connector assembly (1) as claimed in claim 1, further comprising an annular seal disposed between the mouth part (20) and the main body (2).

11. The hose connector assembly (1) as claimed in claim 1, wherein the main body (2) connects in a liquid-conducting manner at least one substantially punctiform hose receptacle (3, 4, 5) to an annular or C-shaped dispensing opening (34) on a side of said main body (2) that faces away from the at least two hose receptacles (3, 4, 5).

12. The hose connector assembly (1) as claimed in claim 1, wherein the main body (2) connects in a liquid-conducting manner at least one of the at least two hose receptacles (3, 4, 5) to a dispensing opening (34) on a side of said main body (2) that faces away from the at least two hose receptacles (3, 4, 5).

13. A method of installing a hose connector assembly (1) according to claim 1 in a sanitary fitting, comprising inserting the at least two hoses (6, 7, 8) laterally into the retaining plate (15), subsequently introducing the at least two hoses (6, 7, 8) into the respective one of the at least two hose receptacles (3, 4, 5), inserting the main body (2) into a fitting outlet of the sanitary fitting, and pressing the retaining plate (15) by way of an outlet mouthpiece (24) that engages on the detent (21) against a support (40) that is configured in the fitting outlet (39), wherein the support (40) is molded to the outlet mouthpiece (24) in an integral manner or the support (40) is formed by an insert part.

14. The method as claimed in claim 13, wherein the outlet mouthpiece (24) at least one of presses the mouth part (20) against the main body (2) or is screw-fitted to the fitting outlet (39).

15. The method as claimed in claim 13, wherein the retaining plate (15) has three of the recesses (16, 17, 18), and further comprising inserting in each case one of said hoses (6, 7, 8) by way of an insertion movement (19) that is aligned so as to be transverse to a longitudinal direction of the respective hose (6, 7, 8) into a respective one of the recesses (16, 17, 18), and subsequently inserting the hoses (6, 7, 8) into the main body (2) on which three corresponding ones of the hose receptacles (3, 4, 5) are configured.

16. A sanitary fitting comprising a fitting outlet (39) and the hose connector assembly (1) as claimed in claim 1, the retaining plate being pressed by the main body (2) against a support (40) of the fitting outlet (39).

17. A hose connector assembly (1) comprising: a main body (2) including at least two hose receptacles (3, 4, 5), at least two hoses (6, 7, 8) which by way of respective ends (9, 10, 11) thereof are plug-fitted in each case into a respective one of the at least two hose receptacles (3, 4, 5), each of the at least two hoses (6, 7, 8) respectively including at least one retaining edge (12, 13, 14), a retaining plate (15) having at least two receptacles (16, 17, 18) corresponding to the at least two hose receptacles (3, 4, 5), the at least two receptacles (16, 17, 18) each being configured such that a respective one of the at least two hoses (6, 7, 8) is insertable therein by an insertion movement (19) that is aligned transverse to a longitudinal direction of the respective hose (6, 7, 8), such that the associated retaining edge (12, 13, 14) engages across the retaining plate (15) in order to prevent each of the hoses (6, 7, 8) from being pulled out of the respective one of the hose receptacles (3, 4, 5), a mouth part (20) that is attached to the main body (2) on a downstream side, the mouth part including a detent (21) that that is adapted to press the main body (2) against the retaining plate (15), and annular seals (29, 30, 31) that seal respective ones of the hoses (6, 7, 8) in the respective hose receptacles (3, 4, 5), the annular seals are disposed on each of the at least two hoses (6, 7, 8), in each of the at least two hose receptacles (3, 4, 5), or both.

18. A hose connector assembly (1) comprising: a main body (2) including at least two hose receptacles (3, 4, 5), at least two hoses (6, 7, 8) which by way of respective ends (9, 10, 11) thereof are plug-fitted in each case into a respective one of the at least two hose receptacles (3, 4, 5), each of the at least two hoses (6, 7, 8) respectively including at least one retaining edge (12, 13, 14), a retaining plate (15) having at least two receptacles (16, 17, 18) corresponding to the at least two hose receptacles (3, 4, 5), the at least two receptacles (16, 17, 18) each being configured such that a respective one of the at least two hoses (6, 7, 8) is insertable therein by an insertion movement (19) that is aligned transverse to a longitudinal direction of the respective hose (6, 7, 8), such that the associated retaining edge (12, 13, 14) engages across the retaining plate (15) in order to prevent each of the hoses (6, 7, 8) from being pulled out of the respective one of the hose receptacles (3, 4, 5), a mouth part (20) that is attached to the main body (2) on a downstream side, the mouth part including a detent (21) that that is adapted to press the main body (2) against the retaining plate (15), and the mouth part (20) is configured as at least one of a jet former or jet regulator unit (35), and at least one of the at least two hose receptacles (3, 4, 5) in the main body (2) is routed to a bypass (41).

* * * * *